US012683311B2

(12) United States Patent
Tagami et al.

(10) Patent No.: US 12,683,311 B2
(45) Date of Patent: Jul. 14, 2026

(54) CONNECTOR

(71) Applicant: MOLEX, LLC, Lisle, IL (US)

(72) Inventors: Hideyo Tagami, Yamato (JP); Junichi Asanuma, Yamato (JP)

(73) Assignee: Molex, LLC, Lisle, IL (US)

( * ) Notice: Subject to any disclaimer, the term of this patent is extended or adjusted under 35 U.S.C. 154(b) by 372 days.

(21) Appl. No.: 18/429,480

(22) Filed: Feb. 1, 2024

(65) Prior Publication Data

US 2024/0235082 A1 Jul. 11, 2024

(30) Foreign Application Priority Data

Dec. 23, 2022 (JP) ................................ 2022-207188

(51) Int. Cl.

*H01R 12/79* (2011.01)
*H01R 12/88* (2011.01)
*H01R 13/502* (2006.01)

(52) U.S. Cl.

CPC ............ *H01R 12/79* (2013.01); *H01R 12/88* (2013.01); *H01R 13/502* (2013.01)

(58) Field of Classification Search

CPC ......... H01R 12/79; H01R 12/88; H01R 12/89
See application file for complete search history.

(56) References Cited

U.S. PATENT DOCUMENTS

| | | | | |
|---|---|---|---|---|
| 4,778,403 A * | 10/1988 | Ikesugi | H01R 12/79 439/495 |
| 4,944,690 A * | 7/1990 | Imai | H01R 12/83 439/495 |

FOREIGN PATENT DOCUMENTS

| | | | |
|---|---|---|---|
| JP | 4380428 | B2 | 10/2009 |
| JP | 2011034684 | A | 2/2011 |
| JP | 5123975 | B2 | 11/2012 |
| JP | 5555143 | B2 | 6/2014 |
| JP | 5739104 | B2 | 5/2015 |

* cited by examiner

*Primary Examiner* — Neil Abrams
*Assistant Examiner* — Tulsidas C Patel

(57) ABSTRACT

For a connector 10, a stopper surface 35*a* interferes with a stopper contacted surface 53*a* when an actuator 50 is in an upright orientation and this restricts movement of the actuator 50 around a support shaft part 52 beyond the upright orientation. The cam control surface 25*c* and stopper surface 35*a* are positioned more to the back than at least a part of the support shaft part 52.

6 Claims, 11 Drawing Sheets

CONNECTOR

RELATED APPLICATION

The present application claims priority to Japanese patent application no. 2022-207188 filed on Dec. 23, 2022, which is incorporated by reference in its entirety.

TECHNICAL FIELD

The present disclosure relates to a connector for a flat cable.

BACKGROUND

Some connectors for connecting flat cables such as a Flexible Printed Circuit (FPC) or Flexible Flat Cable (FFC) include an actuator for pressing contact points of terminals onto the surface of the flat cable. The connectors disclosed in Patent Documents 1 and 2 include a brace part and a fore-upward extending part extending to the front from the brace part and an aft-upward extending part extending to the rear from the brace part. The actuator includes a cam part that is provided below the aft-upward extending part. The actuator includes support shaft parts at the end parts thereof retained by the housing. The actuator can rotate between an upright orientation and a horizontal orientation around the support shaft part.

When in the upright orientation, the actuator falls backward, and when in the horizontal orientation, the cam part rises up and pushes the aft-upward extending part upward. Here, the terminals elastically deform causing the fore-extension upper part to lower with the brace part as a fulcrum. As a result, contact points formed on the fore-extension upper part are pressed onto the surface of the flat cable. When the actuator is returned from the horizontal orientation to the upright orientation, the cam parts are separated from the aft-upward extending part and the contact points separate from the flat cable. With the connectors disclosed in Patent Documents 1 and 2, terminals are formed on a protruding part positioned behind the cam part. This protruding part restricts the backward movement of the cam part.

Patent Document 1: Japanese Unexamined Patent Application Publication 2011-222269

Patent Document 2: Japanese Unexamined Patent Application Publication 2012-119082

SUMMARY

In a transport process of the connector or an assembly process on equipment that mounts the connector, there are times when an external force (force in the direction opposite the direction the horizontal orientation faces) in a direction of causing the actuator to fall forward is unintentionally applied to the top of the actuator in the upright orientation. When this type of external force is applied to the actuator, the cam part is caused to move obliquely upward and may cause the cam part to ride up onto the protruding part. This leads to separation of the actuator from the connector.

(1) A connector proposed by the present disclosure, includes:

a plurality of terminals, each including a contact point and lined up in a first direction;

a housing for retaining the plurality of terminals open facing a first side in a second direction that intersects with the first direction, and into which a flat cable can be inserted through the opening;

an actuator including a cam part for deforming the terminals to press the contact points against the flat cable surface and a stopper contacted surface;

a cam control surface positioned on a second side in the second direction relative to the cam part that controls movement of the cam part toward the second side; and a stopper surface, wherein the actuator is supported by a support shaft part positioned at the end of the actuator in the first direction that enables rotating between an upright orientation and a horizontal orientation, the horizontal orientation is an orientation where the cam part causes deformation to the plurality of terminals to press the contact points against the flat cable and the upright orientation is an orientation that eliminates deformation of the plurality of terminals caused by the cam part, there is interference between the stopper surface and the stopper contacted surface when the actuator is in the upright orientation, and this restricts movement of the actuator around the support shaft part beyond the upright orientation, and the cam control surface and stopper surface are positioned more to the second side in the second direction than at least a part of the support shaft part.

With this connector, in the case that an unintentional external force is applied to the actuator, upward movement (movement in a direction beyond the cam control surface) of the cam part can be reduced.

(2) The connector according to (1), wherein the position of the stopper surface in the second direction is the same as the cam control surface position or more to the second side in the second direction than the cam control surface position.

(3) The connector according to (1) or (2), wherein the housing includes a pair of arm parts extending towards the second side in the second direction, the actuator is provided between the pair of arm parts, and the stopper surface is formed on this pair of arm parts.

(4) The connector according to (3), wherein a stopper protruding part protruding toward the center of the connector is formed on this pair of arm parts in the first direction, and the stopper protruding part includes a surface facing the second side in the second direction as the stopper surface.

(5) The connector according to (3), wherein the actuator includes a stopper protruding part contacted part protruding in the first direction, and the stopper protruding part includes a surface facing the first side in the second direction as the stopper contacted surface.

(6) The connector according to any one of (1) to (5), wherein at least one of the stopper surface and stopper contacted surface includes a first edge part positioned to the center in the first direction and a second edge part positioned to the outside in the first direction, and at least one of the stopper surfaces, and the stopper contacted surface is inclined such that the second edge part is positioned more to the first side than the first edge part in the second direction.

DETAILED DESCRIPTION

The connector proposed in the present disclosure will be described with reference to the drawings. The present disclosure describes a connector 10 depicted in FIG. 1 and the like as an example of a connector.

In the following description, the Y1 and Y2 directions shown in FIG. 1 and the like are referred to as forward and backward, respectively. In addition, the X1 and X2 directions indicated in FIG. 1 and the like are referred to as rightward and leftward respectively, and Z1 and Z2 directions are referred to as upward and downward respectively. Note that these directions are to specify relative positional relationships of the connector 10 elements (components, members, and sections) and do not restrict orientation of the connector 10 when the connector 10 is used.

The left-right direction (X1-X2 direction) corresponds to the "first direction" referred to in the claims. The front-to-back direction (Y1-Y2 direction) corresponds to the "second direction" referred to in the claims. The Y1 direction corresponds to the "first side in the second direction" referred to in the claims and the Y2 direction corresponds to the "second side in the second direction" referred to in the claims.

Figure 2:
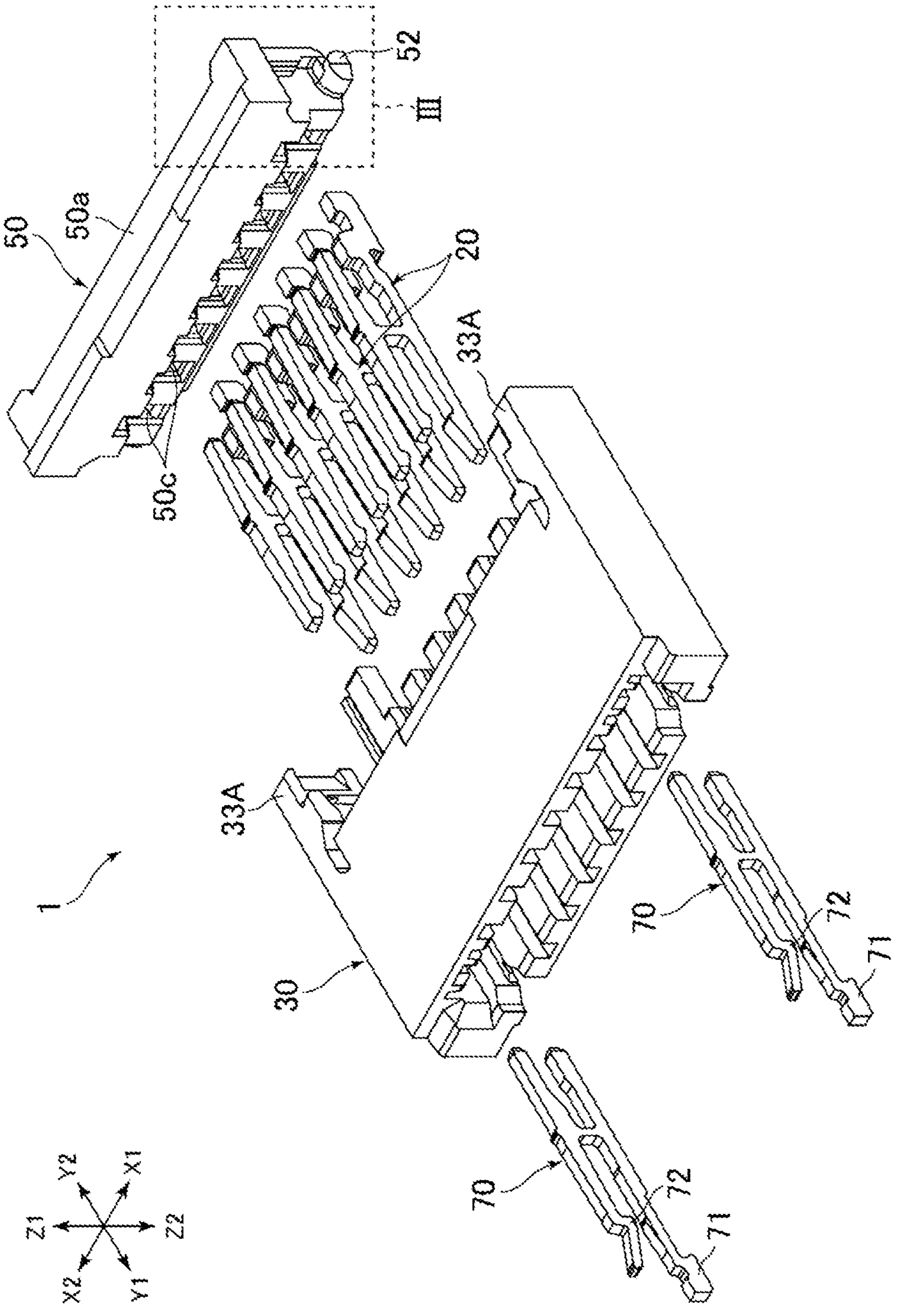
FIG. 2 is an exploded perspective view of the connector depicted in FIG. 1.

As depicted in FIG. 2, the connector 10 includes a plurality of terminals 20 lined up equally spaced in the left-right direction, a housing 30 for retaining the plurality of terminals 20, and an actuator 50.

The connector 10 is a so-called back-flip type connector with the actuator 50 provided on the back of the connector 10.

Figure 1:
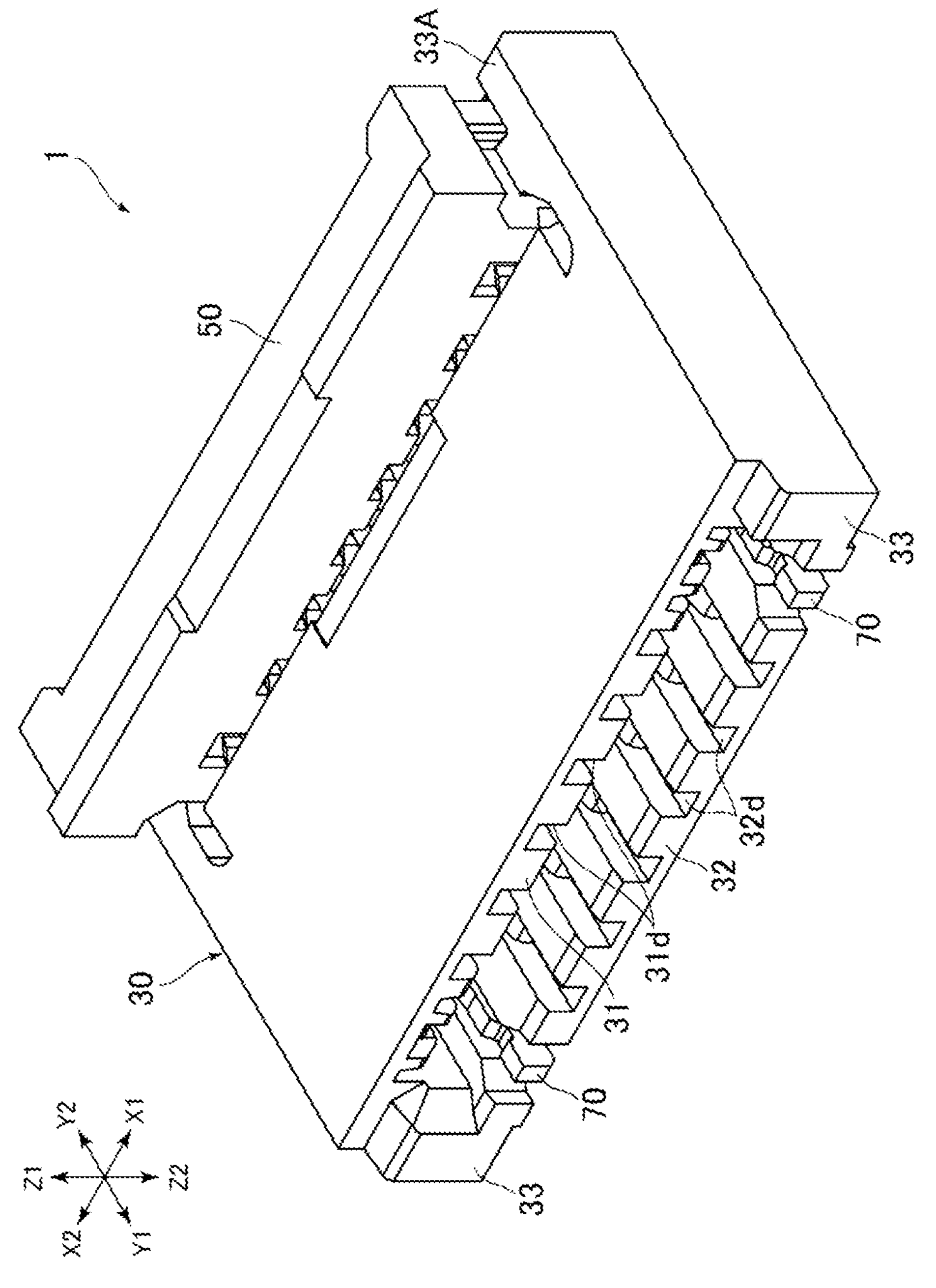
FIG. 1 is a perspective view depicting a connector proposed by the present disclosure.

As depicted in FIG. 1, the housing 30 may include an upper wall part 31 and a bottom part 32 formed separated in the up-down direction. In addition, the housing 30 may include side wall parts 33 positioned on the right side and the left side of and connecting the upper wall part 31 and the bottom part 32. The housing 30 opens to the front side. The housing 30 can receive a flat cable 90 (see FIG. 6A) through this opening. The flat cable may be a FPC or a FFC. In addition, the housing 30 opens to the back. The housing 30 may be molded using an insulating resin material.

Figure 6A:
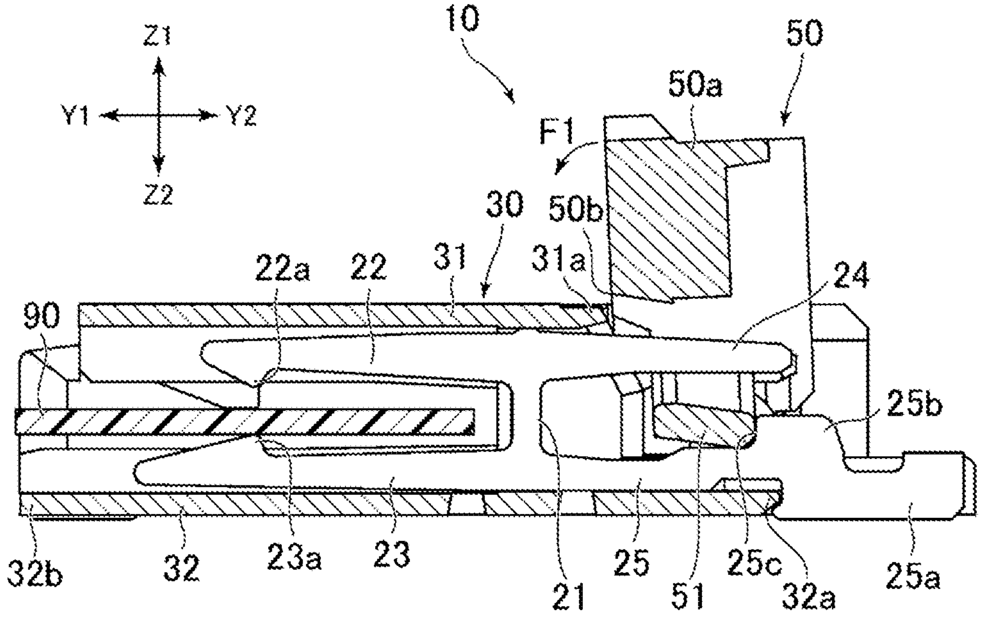
FIG. 6A is a cross-section view along line VIa-VIa depicted in FIG. 5. In this view, the actuator is oriented in an upright orientation.

As depicted in FIG. 6A, each of the terminals 20 may be formed in, for example, a substantially H shape. Each of the terminals 20 may include, for example, a brace part 21, a fore-upward extending part 22 extending forward from the upper part of the brace part 21, a fore-downward extending part 23 extending forward from the bottom part of the brace part 21, an aft-upward extending part 24 extending backward from the upper part of the brace part 21, and an aft-downward extending part 25 extending backward from the lower part of the brace part 21. The terminals 20 are formed, for example, by punching out a thin sheet of conductive metal.

The terminals 20 have a contact point 22*a*. The contact points 22*a* contact an electrical wire end part formed on the flat cable 90 and establish an electrical connection between the terminals 20 and the flat cable 90. As depicted in FIG. 6A, the fore-upward extending part 22 is positioned on the upper side of the flat cable 90 inserted into the connector 10. The contact points 22*a* may be protruding parts protruding downward, for example, from the fore-upward extending part 22.

In addition, the terminals 20 may include contact points 23*a* opposing the contact points 22*a* in the vertical direction. As depicted in FIG. 6A, the fore-downward extending part 23 is positioned on the bottom side of the flat cable 90 inserted into the connector 10. The contact points 23*a* may be protruding parts protruding upward from the fore-downward extending part 23. While using the connector 10, the aft-upward extending part 24 is pushed upwards by the action of a cam part 51 of the actuator 50, described below. As a result, the terminals 20 elastically deform causing the fore-upward extending part 22 to deflect downwards with the upper part of the brace part 21 as a fulcrum, causing the contact points 22*a* to be pressed onto the surface of the flat cable 90 (see FIG. 7A). The flat cable 90 is sandwiched between the contact points 22*a* and 23*a*.

Note that unlike the example depicted in FIG. 6A, the contact points 23*a* formed on the fore-downward extending part 23 may function as contact points for establishing an electrical connection between the terminals 20 and the flat cable 90. In this case, the contact points 22*a* formed on the fore-upward extending part 22 may be used to press the flat cable 90 onto the contact points 23*a*. In addition, both the two contact points 22*a* and 23*a* may electrically connect with the flat cable 90.

The terminals 20 may include a connecting part for connecting with a circuit board mounted in the connector 10. As depicted in FIG. 6A, a connecting part 25*a* may be formed, for example, at the rear end of the aft-downward extending part 25. The connecting part 25*a* may be positioned to the rear of the rear edge 32*a* of the bottom part 32 of the housing 30. The plurality of terminals 20 electrically connect the plurality of electrical wires (conductor patterns) formed on the flat cable 90 to the conductor patterns on the circuit board. This type of terminal 20 is inserted from the back side of the housing 30 into grooves 31*d* and 32*d* (see FIG. 1) formed on an inner surface (lower surface of upper wall part 31 and upper surface of bottom part 32) of the housing 30.

Differing from the example depicted in FIG. 6A and the like, a connecting part may be formed, for example, on the front end of the fore-downward extending part 23. This connecting part may be positioned in front of a front edge 32*b* of the bottom part 32 of the housing 30. This type of terminal is inserted from the front side of the housing 30 into grooves 31*d* and 32*d* formed on the inner surface (lower surface of upper wall part 31 and upper surface of bottom part 32) of the housing 30. The connector 10 may have both terminals 20 inserted from the back side of the housing 30 and terminals inserted from the front side of the housing 30, and these two types of terminals may be alternately arranged in the left-right direction.

In addition, the terminals 20 may be formed in a substantially H shape. For example, it is feasible for the terminals 20 to not have the fore-downward extending part 23. In addition, it is feasible for the terminals 20 to not have the aft-downward extending part 25.

As depicted in FIG. 2, the connector 10 may include a reinforcement fitting 70. The reinforcement fitting 70 may be, for example, provided to the outside of the plurality of terminals 20 in the left-right direction. The reinforcement fitting 70 may include a connecting part 71 positioned to the front of the front edge 32*b* of the housing 30 bottom part 32. The connecting part 71 connects with the circuit board on which the connector 10 is mounted. Thus, the mounting strength of the connector 10 onto the circuit board can be increased.

In addition, the reinforcement fitting 70 may include engaging parts 72 for engaging with holes or recessed parts formed at the left and right edges of the flat cable 90. This effectively prevents separation of the flat cable 90 from the connector 10. This type of reinforcement fitting 70 may be formed in a substantially H-shape, similar to the terminals 20.

Figure 4:
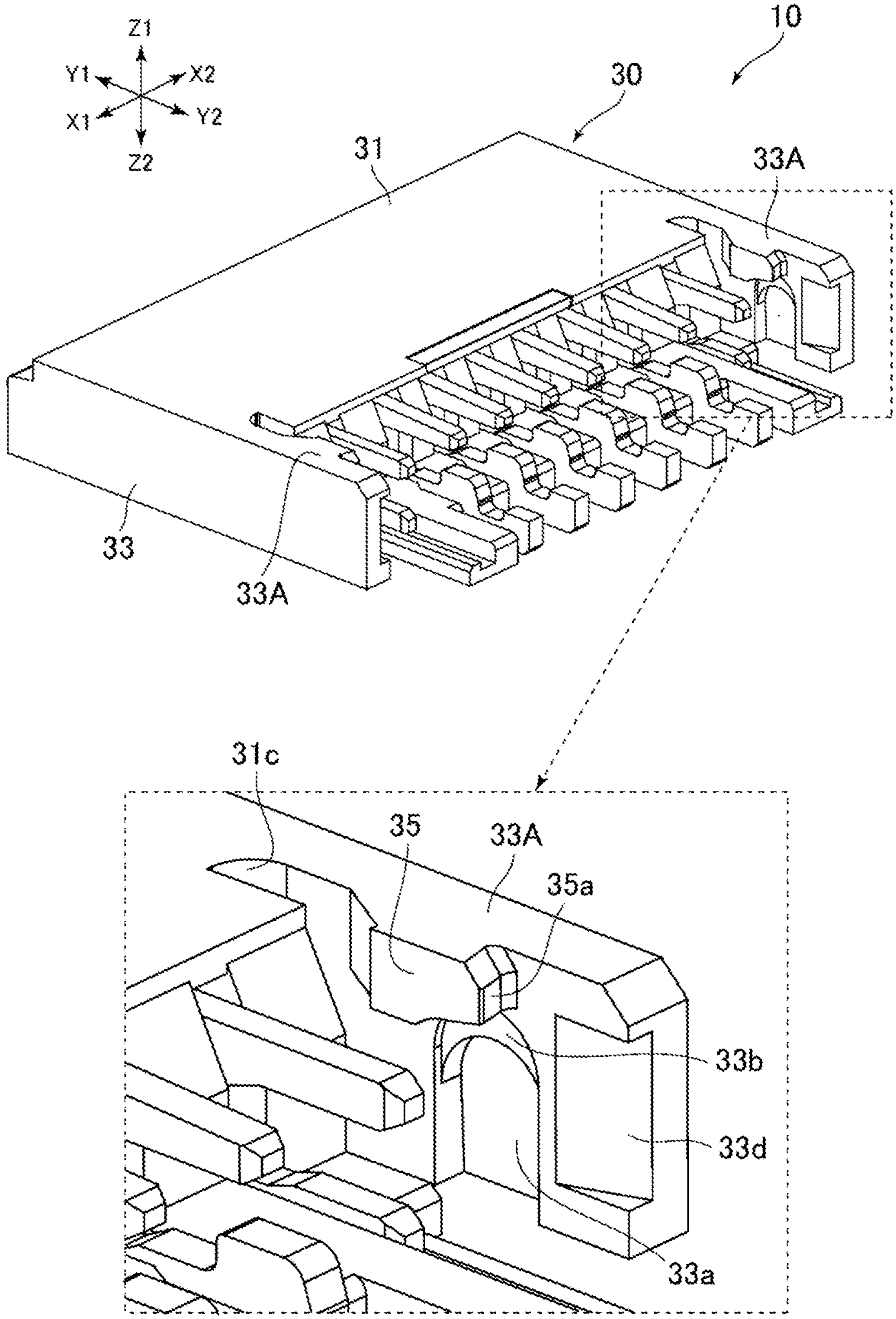
FIG. 4 is a perspective view facing the rear of the housing including the connector depicted in FIG. 1.
Figure 5:
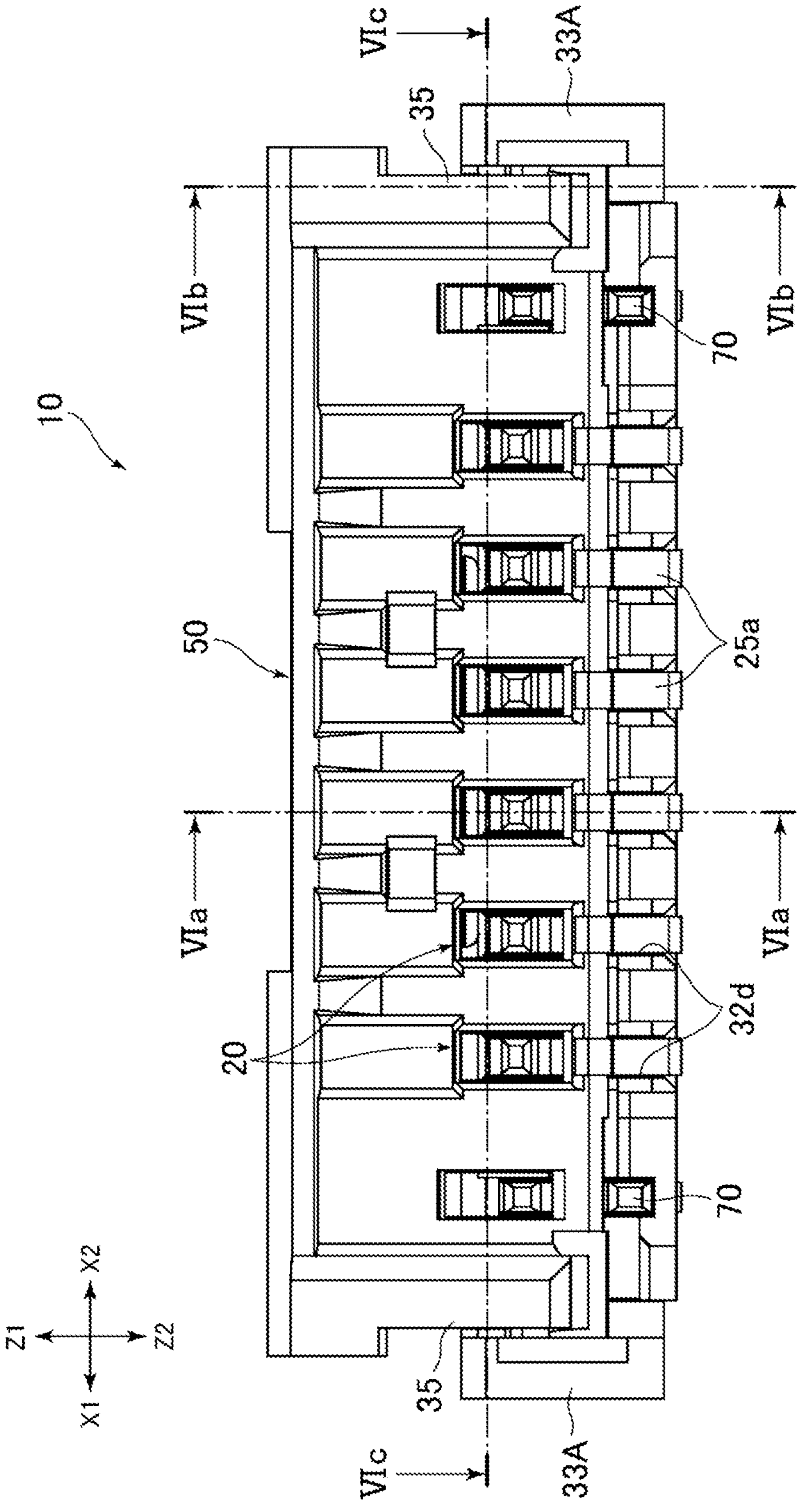
FIG. 5 is a rear view of the connector depicted in FIG. 1. In this view, the actuator is oriented in an upright orientation.

As depicted in FIG. 4, the housing 30 includes a pair of arm parts 33A extending backward. The pair of arm parts 33A are separated in the left-right direction. The arm parts 33A may, for example, extend backward from the left- and right-side wall parts 33.

Figure 3:
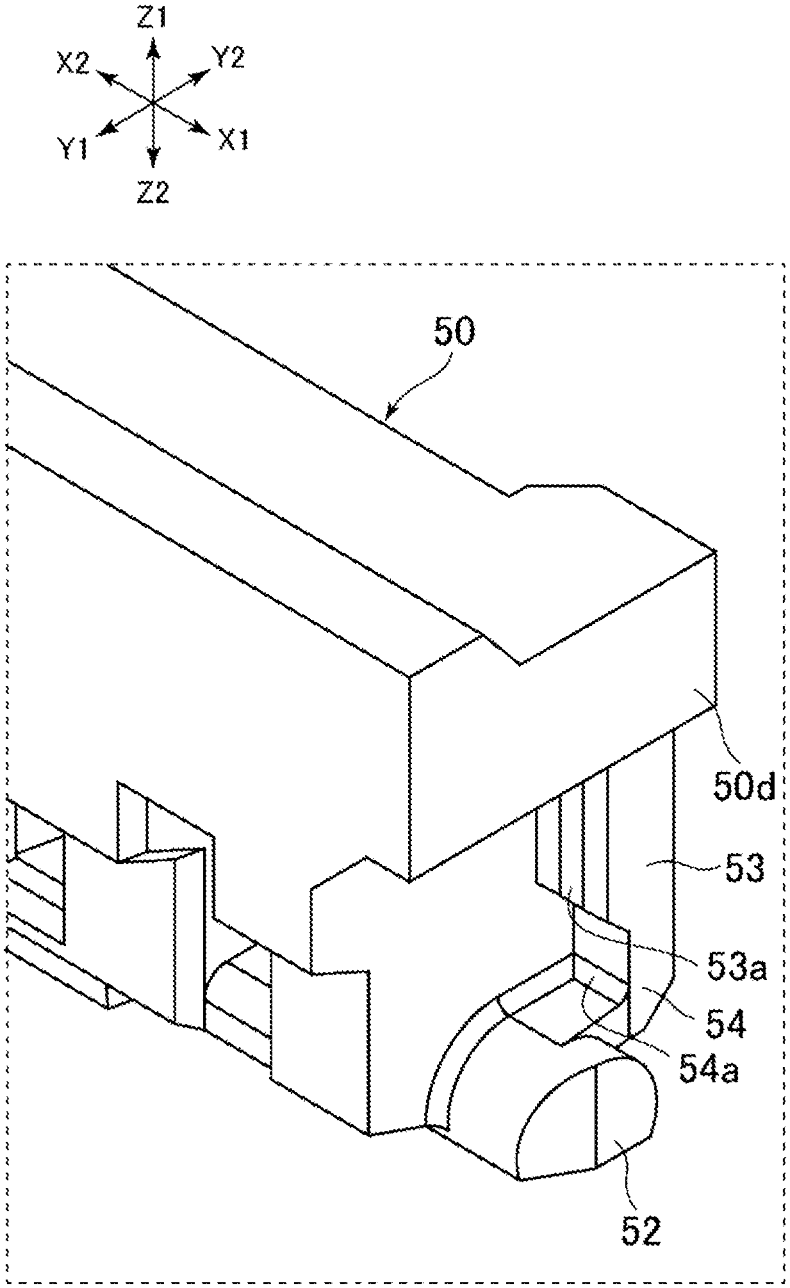
FIG. 3 is an enlarged view of Region III depicted in FIG. 2.

The actuator 50 is positioned between the left and right arm parts 33A. As depicted in FIG. 3, the actuator 50 may include support shaft parts 52 on each of the right-side surface and the left-side surface thereof. The support shaft parts 52 on the left and right protrude to the left and right from the side surface of the actuator 50 and are retained respectively by the left and right arm parts 33A. As depicted in FIG. 4, retaining recessed parts 33*a* may be formed on the inner surface (left-right direction surfaces facing the center) of the arm parts 33A. The support shaft parts 52 may mate with the retaining recessed parts 33*a* to enable retaining inside the retaining recessed parts 33*a*. The support shaft parts 52 can rotate inside the retaining recessed parts 33*a*.

Note that unlike the example depicted in FIG. 3 and the like, the support shaft part may be formed on the arm parts 33A rather than the actuator 50. In this case, retaining recessed parts for retaining the support shaft parts may be formed on the right-side surface and the left-side surface of the actuator 50.

The actuator 50 may include a plurality of cam parts 51, as depicted in FIG. 6A. A plurality of mating holes 50*c* (see FIG. 2) for mating respectively with the plurality of aft-upward extending parts 24 may be formed in the actuator 50. The plurality of cam parts 51 may be arranged lined up in the left-right direction on the bottom side of the aft-upward extending parts 24. The cam parts 51 may be arranged between the aft-downward extending part 25 and the aft-upward extending part 24 and may be rotatable therebetween. The cam part 51 is a section having a substantially elliptic shape cross section, for example.

Figure 7A:
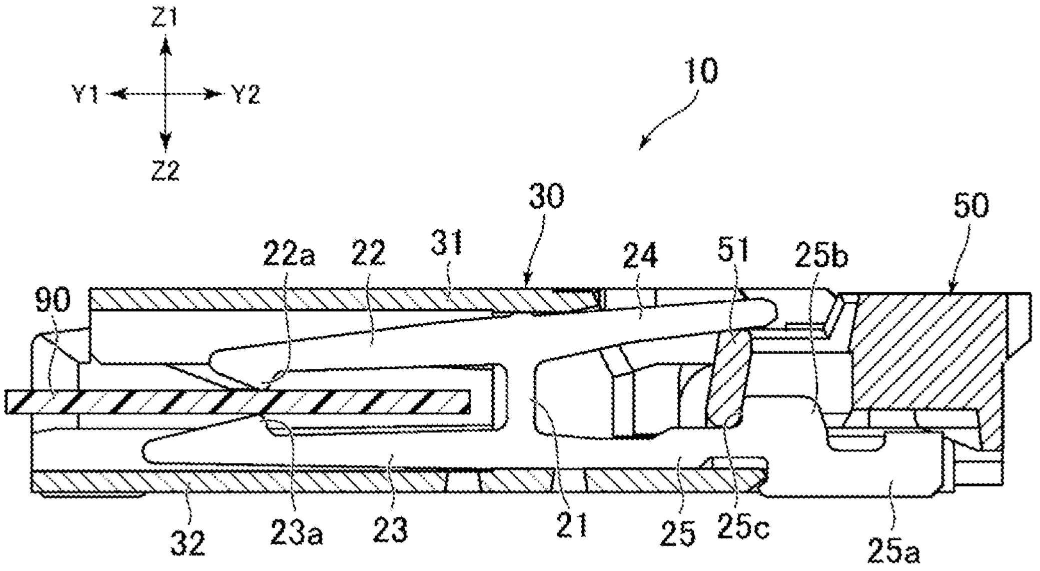
FIG. 7A is a cross-section view obtained using the same cutting plane as FIG. 6A. In this view, the actuator is oriented in a horizontal orientation.
Figure 7B:
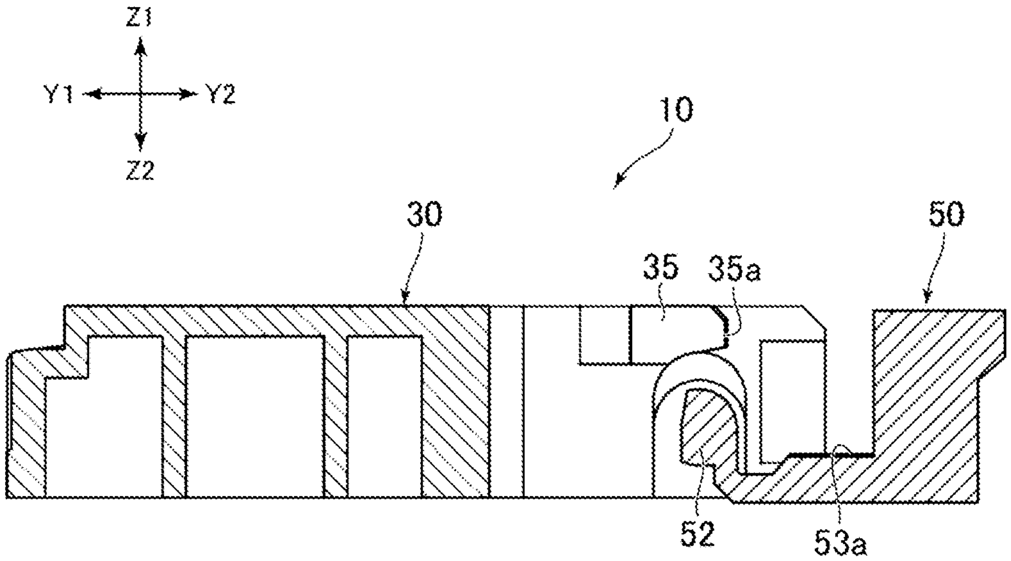
FIG. 7B is a cross-section view obtained using the same cutting plane as FIG. 6B. In this view, the actuator is oriented in a horizontal orientation.

The actuator 50 is supported by the support shaft part 52 and can rotate between an upright orientation (see FIG. 6A) and a horizontal orientation (see FIG. 7A).

The horizontal orientation is an orientation pressing the contact points 22*a* of the terminals 20 onto the flat cable 90, causing deformation of the terminals 20. As depicted in FIG. 7A, when the actuator 50 is in a horizontal orientation, the long-axis direction of the cam parts 51 (direction in which width of cam parts 51 is greatest) is oriented facing a direction that intersects with the aft-upward extending part 24 and aft-downward extending part 25 and pushes up the aft-upward extending part 24. As a result, the terminals 20 elastically deform causing the fore-upward extending part 22 to lower and the contact points 22*a* to be pressed onto the flat cable 90. The lower parts of the cam parts 51 are supported by the aft-downward extending part 25.

The upright orientation is an orientation where deformation of the terminals 20 caused by the cam parts 51 is eliminated. As depicted in FIG. 6A, when the actuator 50 is in an upright orientation, the cam parts 51 are arranged so the long-axis direction of the cam parts 51 is substantially aligned in the direction of the aft-upward extending part 24 and the aft-downward extending part 25. As a result, pushing up of the aft-downward extending part 25 by the cam parts 51 is eliminated. Furthermore, elastic deformation of the fore-upward extending part 22 is eliminated. Having the actuator 50 in an upright orientation permits insertion and removal of the flat cable 90 into and out of the connector 10.

The actuator 50 includes an operated part 50*a* (see FIG. 1 and FIG. 6A) separated from the cam parts 51 in a direction that is orthogonal to the left-right direction. The operator operating this operated part 50*a* can arrange the actuator 50 in the upright orientation and in the horizontal orientation. When the actuator 50 is in the upright orientation, the operated part 50*a* is positioned above the cam parts 51. When the actuator 50 is in the horizontal orientation, the operated part 50*a* is positioned behind the cam parts 51.

As depicted in FIG. 6A, the connector 10 includes a cam control surface 25*c* positioned in back of the cam parts 51. The cam control surface 25*c* is an upright surface behind the cam parts 51. The cam control surface 25*c* controls movement to the back of the cam parts 51. For example, a control protruding part 25*b* protruding upward is formed on the aft-downward extending part 25 of the terminal 20 and positioned behind the cam part 51. The control protruding part 25*b* includes a cam control surface 25*c* on the front surface thereof. The cam control surface 25*c* is preferably formed essentially parallel to the vertical direction (up-down direction).

Note that unlike the example depicted in FIG. 6A and the like, the control protruding part 25*b* and the cam control surface 25*c* may be formed on the bottom part 32 of the housing 30 rather than the terminals 20.

In a lot of cases, separation of the actuator 50 from the connector 10 is suppressed by this cam control surface 25*c*. However, there are cases during a transport process of the connector 10 or an assembly process on equipment that mounts the connector 10 where an external force (force in the F1 direction in FIG. 6A) that would cause the actuator 50 in an upright orientation to fall forward is applied to the operating part (upper part) 50*a* of the actuator 50. Due to this type of external force, for example, the front surface 50*b* (see FIG. 6B) of the actuator 50 collides with the rear edge 31*a* (see FIG. 6A) of the upper wall part 31 of the housing 30 and with the rear edge 31*a* functioning as a center of rotation of the actuator 50, the cam part 51 attempts to move obliquely backward and upward. In a conventional structure, the rear edge 31*a* of the upper wall part 31 is positioned in front of the support shaft part 52 (see FIG. 3) and the cam control surface 25*c* is positioned to the rear of the support shaft part 52 so the center of rotation (rear edge 31*a*) of the actuator 50 is positioned far forward from the cam control surface 25*c*. As a result, the cam parts 51 move upward by a large amount. As a result, the cam parts 51 may ride up onto the control protruding part 25*b*.

With the connector 10 proposed by the present disclosure, the housing 30 and actuator 50 respectively include a stopper surface 35*a* (see FIG. 6C) and a stopper contacted surface 53*a* (see FIG. 6C) to reduce this type of movement of the cam part 51.

Figure 6B:
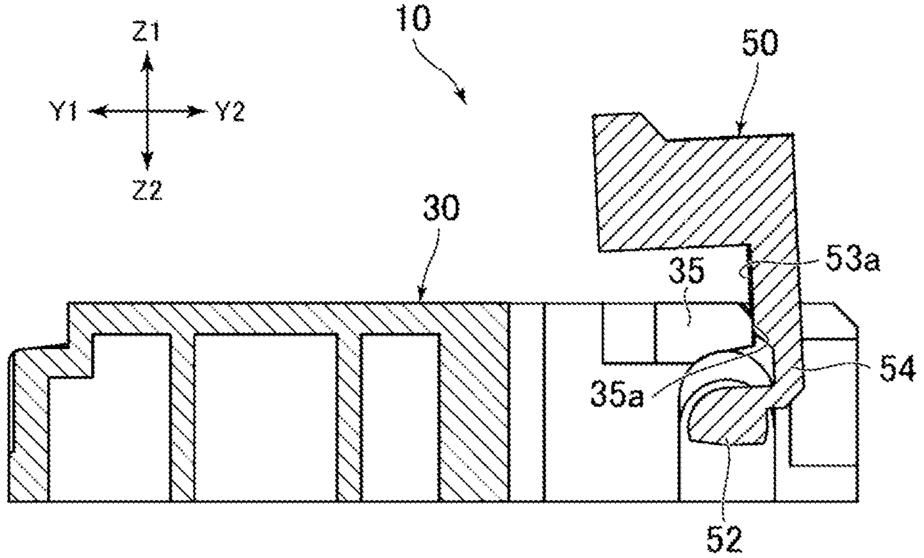
FIG. 6B is a cross-section view along line VIb-VIb depicted in FIG. 5. In this view, the actuator is oriented in an upright orientation.
Figure 6C:
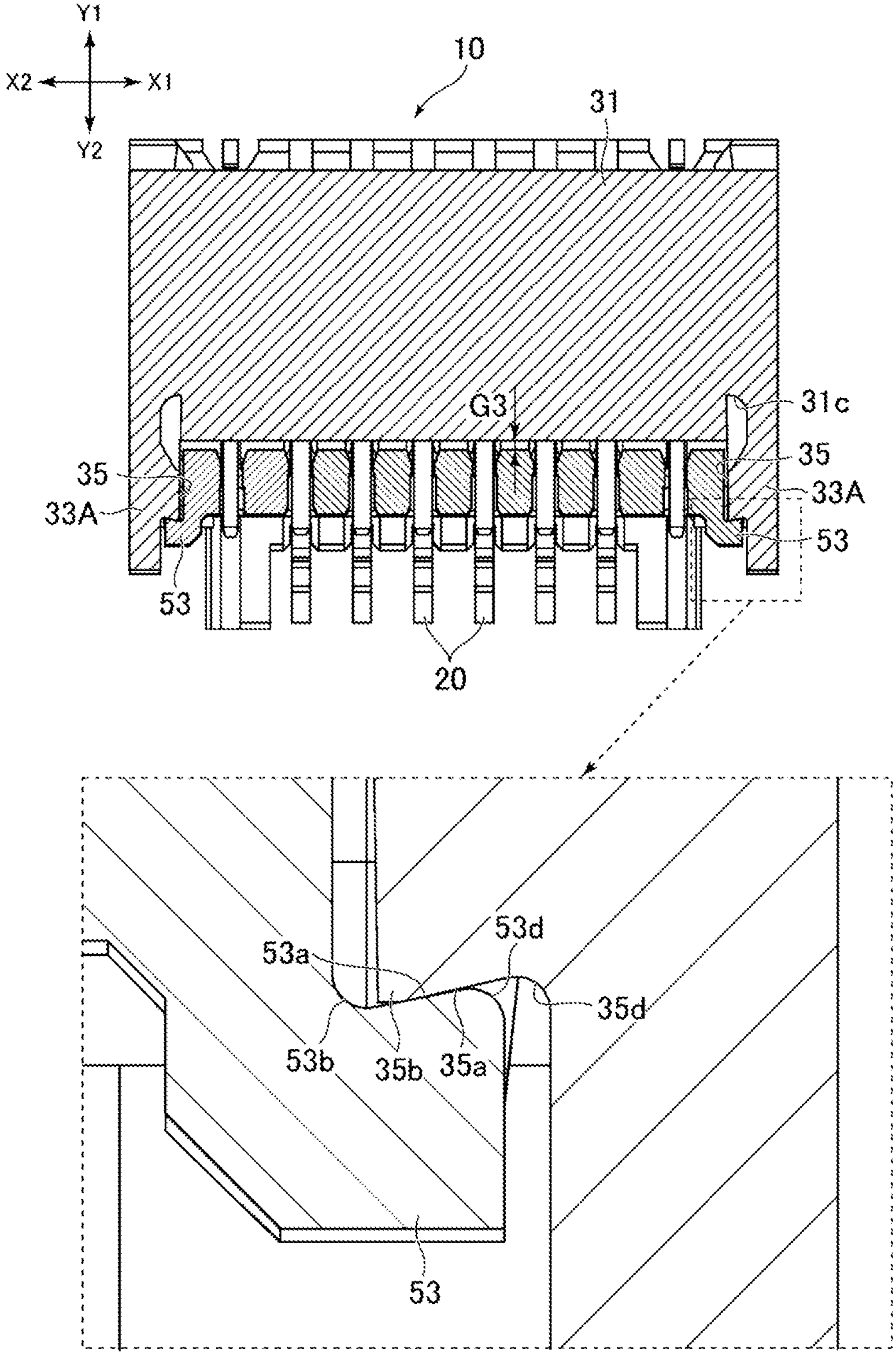
FIG. 6C is a cross-section view along line VIc-VIc depicted in FIG. 5. In this view, the actuator is oriented in an upright orientation.

As depicted in FIG. 4 and FIG. 6C, stopper protruding parts 35 may be formed on the left and right arm parts 33A. The stopper protruding parts 35 are, for example, formed on the upper parts of the arm parts 33A. The stopper protruding parts 35 protrude in the left-right direction from the arm parts 33A toward the center. The stopper protruding parts 35 may be positioned behind a recessed parts 31*a* (recessed parts formed at both ends of the rear edge 31*a* of the upper wall part 31) described below. The stopper protruding parts 35 include a stopper surface 35*a* as a surface facing backward.

On the other hand, the actuator 50 includes a stopper contacted surface 53*a* as depicted in FIG. 3 and FIG. 6C. The actuator 50 may include two stopper protruding part contacted parts 53 respectively protruding to the left and to the right. The stopper protruding part contacted parts 53 may be formed on the right-side surface and the left-side surface of the actuator 50. The stopper protruding part contacted part 53 includes the stopper contacted surface 53*a* as a surface facing forward.

As depicted in FIG. 6B and FIG. 6C, when the actuator 50 is in an upright orientation, the stopper surface 35*a* interferes with the stopper contacted surface 53*a*, restricting movement of the actuator 50 around the support shaft part 52 beyond the upright orientation. In other words, the stopper surface 35*a* controls forward falling of the operated part 50*a* of the actuator 50. In the side view, the stopper surface 35*a* is preferably formed along the vertical direction or along a direction obliquely upward and backward. This effectively suppresses forward tilting of the actuator 50.

When an external force (force in F1 direction in FIG. 6A) attempting to cause the actuator 50 in an upright orientation to fall forward is applied, the actuator 50 attempts to rotate centered on the stopper surface 35*a* position and the stopper contacted surface 53*a* comes into contact with the stopper surface 35*a*. Here, the front surface 50*b* of the actuator 50 need not be in contact with the rear edge 31*a* of the upper wall part 31 of the housing 30. In other words, as depicted in FIG. 6C, a gap G3 may be secured between the front surface 50*b* and the rear edge 31*a*.

Figure 8:
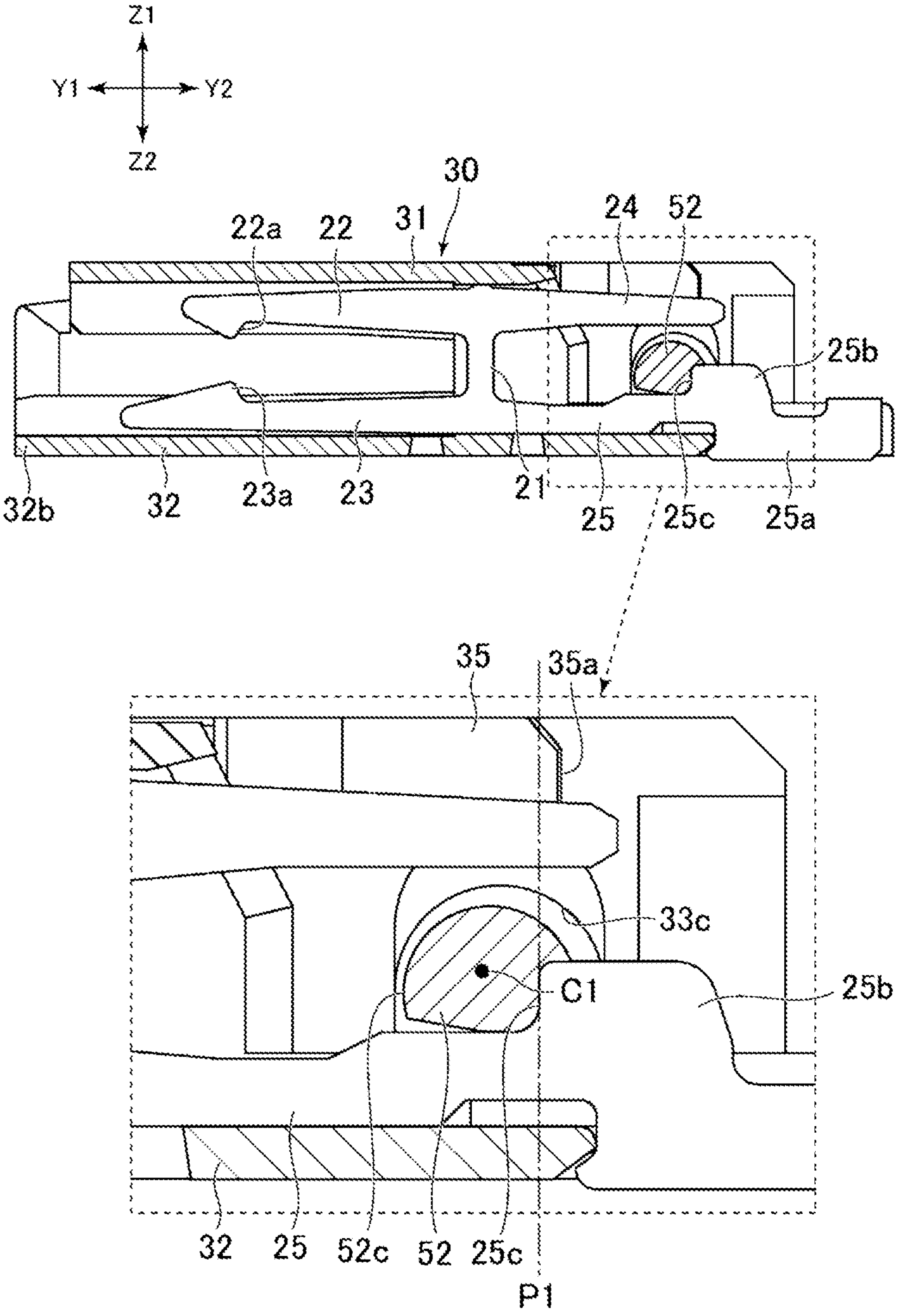
FIG. 8 describes the relative positional relationships between the support shaft part formed on the actuator, the stopper surface, and the cam control surface.

As depicted in FIG. 8, the cam control surface 25*c* formed on the terminal 20 and the stopper surface 35*a* may be positioned behind at least a part of the support shaft part 52. More specifically, the cam control surface 25*c* and stopper surface 35*a* may be positioned more to the rear than front end 52*a* of the outer circumferential surface of the support shaft part 52. The stopper protruding parts 35 may be positioned above the retaining recessed parts 33*a* formed on the arm parts 33A.

With this type of positional relationship, the distance in the front-to-back direction between the cam control surface 25*c* and the stopper surface 35*a* is smaller as compared to that of a conventional structure. Therefore, upward movement of the cam parts 51 is reduced when the external force (force in F1 direction in FIG. 6A) described above is applied to the actuator 50 and, as a result, effectively prevents riding up of the cam parts 51 onto the control protruding part 25*b*.

Note that the stopper surface 35*a* may be inclined relative to the front-to-back direction as depicted in FIG. 8. In this case, at least a part of the stopper surface 35*a* (specifically, at least a part of the edge part 35*b* to the center in the left-right direction) may be positioned to the rear of the front end 52*a* on the outer circumferential surface of the support shaft part 52. As depicted in FIG. 8, the entirety of the stopper surface 35*a* is preferably positioned to the rear of the front end 52*a*. The inclination of the stopper surface 35*a* will be described in detail below.

As depicted in FIG. 8, the cam control surface 25*c* and the stopper surface 35*a* may be positioned to the rear of the center Cl of the support shaft part 52. This type of positional relationship further enables reducing the distance in the front-to-back direction between the cam control surface 25*c* and the stopper surface 35*a*, enabling further effective reduction in upward movement of the cam parts 51.

As depicted in FIG. 8, the position of the stopper surface 35*a* in the front-to-back direction is preferably the same as the cam control surface 25*c* or may be to the rear of the cam control surface 25*c*. In other words, the position of the stopper surface 35*a* may be the same as a vertical plane P1 that passes through the cam control surface 25*c* or may be behind the vertical plane P1.

This type of positional relationship more effectively suppresses upward movement of the cam parts 51 when the external force (force in F1 direction in FIG. 6A) described above is applied to the actuator 50. In particular, in the case that the position of the stopper surface 35*a* is behind the vertical plane P1 and the external force described above is applied to the actuator 50, the movement direction of the cam parts 51 is obliquely rearward and downward. As a result, riding up of the cam parts 51 onto the control protruding part 25*b* can be more effectively suppressed.

Note that the cam control surface 25*c* may be inclined to the front or to the rear relative to the vertical plane P1. In this case, the position of at least a part of the stopper surface 35*a* in the front-to-back direction may be positioned behind the front end of the cam control surface 25*c*.

As described above, the stopper surface 35*a* is formed on the arm parts 33A extending in the front-to-back direction. This structure increases the degree of freedom of positioning the stopper surface 35*a* in the front-to-back direction. In the present disclosure, the position of the stopper surface 35*a* as described above is achieved using the length of the arm part 33A.

In addition, the stopper surface 35*a* may be positioned to the rear of the rear edge 31*a* of the upper wall part 31 of the housing 30. More specifically, the entirety of the stopper protruding parts 35 may be positioned to the rear of the rear edge 31*a* of the upper wall part 31 of the housing 30. With this positional relationship, the distance in the front-to-back direction between the cam control surface 25*c* and the stopper surface 35*a* is smaller as compared to that of a conventional structure. Thus, compared to a conventional structure, upward movement of the cam parts 51 can be reduced for the case the external force described above is applied to the actuator 50.

As depicted in FIG. 8, the stopper surface 35*a* of the housing 30 may be inclined in the front-to-back direction. More specifically, the stopper surface 35*a* may include an inner edge part 35*b* positioned toward the center in the left-right direction and an outer edge part 35*d* positioned to the outside in the left-right direction. Furthermore, the stopper surface 35*a* may be inclined so that the outer edge part 35*d* is positioned more to the front than the inner edge part 35*b*.

In addition, the stopper contacted surface 53*a* of the actuator 50 may be inclined relative to the front-to-back direction. More specifically, the stopper contacted surface 53*a* may include an inner edge part 53*b* positioned toward the center in the left-right direction and an outer edge part 53*d* positioned to the outside in the left-right direction. Furthermore, the stopper contacted surface 53*a* may be inclined so that the outer edge part 53*d* is positioned more to the front than the inner edge part 53*b*.

With the type of inclination of the stopper surface 35*a* and stopper contacted surface 53*a,* when an external force that would cause the actuator 50 to fall forward is applied to the operated part 50*a* of the actuator 50, spreading of the arm parts 33A to the outside in the left-right direction can be prevented. As a result, the actuator 50 can more effectively be prevented from falling forward beyond the upright orientation.

As depicted in FIG. 4 and FIG. 6C, the upper wall part 31 of the housing 30 may include a recessed part 31*c* positioned at the end part of the rear edge 31*a* in the left-right direction. The recessed part 31*c* is positioned between the upper wall part 31 and the side wall parts 33. This recessed part 31*c* increases the length of the arm parts 33A. In other words, the range of feasible elastic deformation to the outside in the left-right direction is increased for the side wall parts 33. Therefore, mounting operation of the actuator 50 to the housing 30 is simplified. This mounting operation will be described below.

Increasing the length of the arm parts 33A in this manner causes the arm parts 33A to more readily spread outward in the case an external force that would cause the actuator 50 to fall forward is applied. However, with the connector 10, the stopper surface 35*a* and the stopper contacted surface 53*a* are inclined, enabling suppressing this type of deformation of the arm parts 33A.

Note that unlike the example depicted in FIG. 6C, only one of the stopper surface 35*a* and stopper contacted surface 53*a* may be included as described above. For example, only the stopper surface 35*a* may be inclined. In this case, the stopper contacted surface 53*a* may be formed to come into contact with a portion between the inner edge part 35*b* and outer edge part 35*d* of the stopper surface 35*a.* On the other hand, only the stopper contacted surface 53*a* may be inclined. In this case, the stopper surface 35*a* may be formed to come into contact with a portion between the inner edge part 53*b* and outer edge part 53*d* of the stopper contacted surface 53*a.* This type of structure also enables suppressing deformation of the arm parts 33A to the outside in the left-right direction.

As depicted in FIG. 3, the stopper protruding part contacted part 53 and the support shaft part 52 may be connected. In further detail, the actuator 50 may include a connecting part 54 on a side surface thereof extending from the support shaft part 52 toward the stopper protruding part contacted part 53. This connecting part 54 enables increasing the strength of the stopper protruding part contacted part 53. As a result, if an external force that would cause the actuator 50 to fall forward is applied to the operated part 50*a* of the actuator 50, deformation of the stopper protruding part contacted part 53 can be suppressed.

In addition, the actuator 50 may include a protruding part 50*d* protruding from the operated part 50*a* to the left or right (see FIG. 3). The stopper protruding part contacted part 53 may be connected to this protruding part 50*d* as well. Thus, the strength of the stopper protruding part contacted part 53 can be further increased.

Assembly work of the connector 10 will be described.

First, a plurality of terminals 20 are mounted in the housing 30. For example, the plurality of terminals 20 are mated respectively through the back of the housing 30 into a plurality of grooves 31*d* and 32*d* (see FIG. 1) formed on the inner surface of the housing 30. Also, the reinforcement fitting 70 is mounted on the housing 30.

Figure 9A:
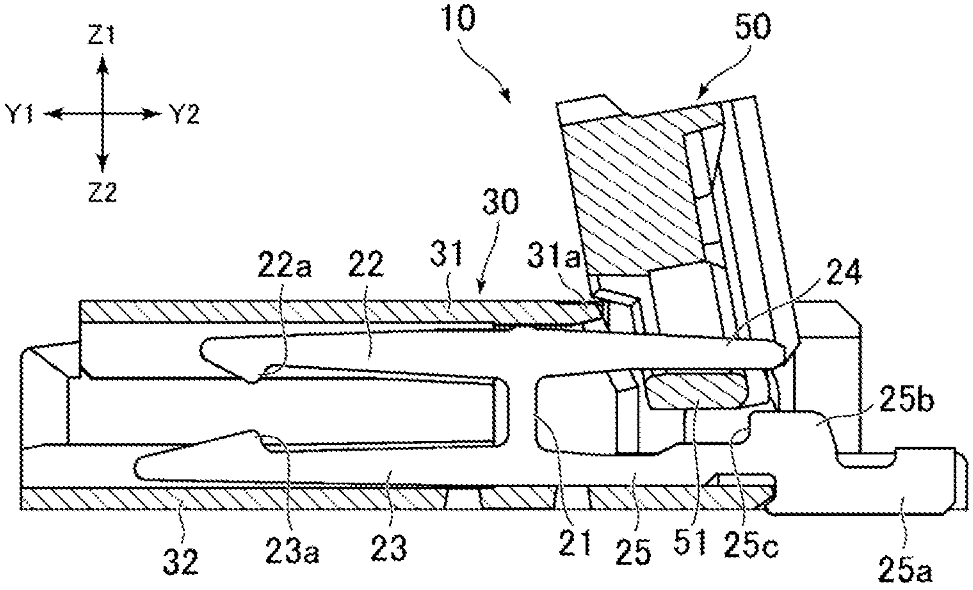
FIG. 9A describes the process of mounting the actuator on the connector. This view is a cross-section view obtained using the same cutting plane as that for FIG. 6A.

Next, the actuator 50 is mounted on the housing 30. Specifically, as depicted in FIG. 9A, the actuator 50 is provided in an orientation facing a direction with the long axis direction of the cam part 51 along the aft-upward extending part 24 direction. Furthermore, the actuator 50 is fitted between the left and right arm parts 33A. Thus, the cam parts 51 pass between the control protruding part 25*b* and the aft-upward extending part 24. This orientation may be an orientation with the actuator 50 more inclined to the front than the upright orientation depicted in FIG. 6A and the like.

As described above, the support shaft part 52 is formed on the side surface of the actuator 50. As depicted in FIG. 4, guide surfaces 33*d* are formed on the inner surfaces of the left and right arm parts 33A. The left and right guide surfaces 33*d* are inclined so that the distance therebetween increases toward the back. When mating the actuator 50 into the left and right arm parts 33A, the support shaft parts 52 push apart the arm parts 33A outwardly in the left-right direction and move forward along the guide surfaces 33*d.* As described above, the recessed part 31*c* (see FIG. 4) is formed between the arm parts 33A and the upper wall part 31, so this type of deformation of the arm parts 33A is more readily permitted, simplifying the mounting work of the actuator 50 to the housing 30.

Figure 9B:
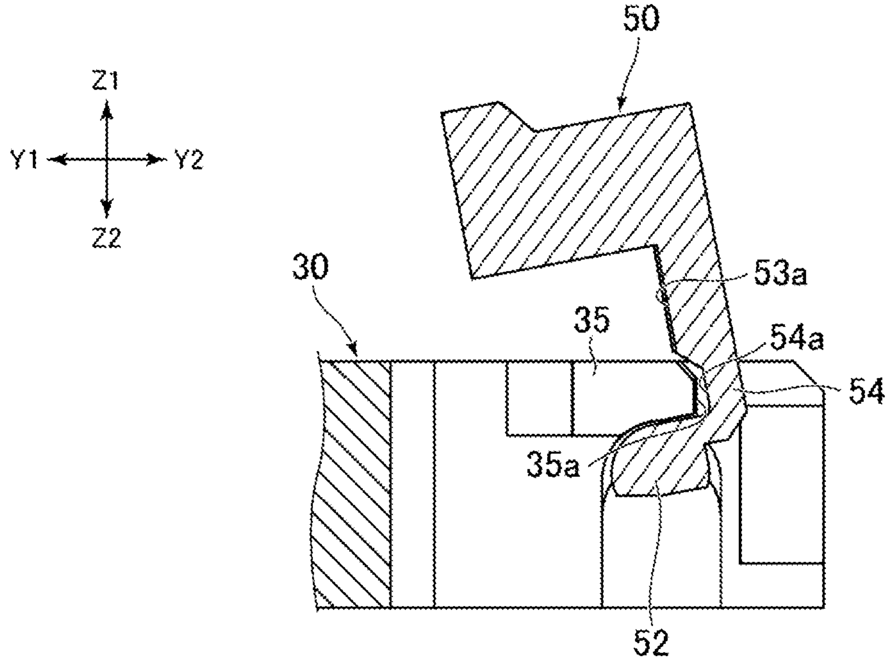
FIG. 9B describes the process of mounting the actuator on the connector. This view is a cross-section view obtained using the same cutting plane as that for FIG. 6B.

As depicted in FIG. 4, a temporary retaining recessed part 33*b* may be formed on the inner surface of the arm parts 33A above the retaining recessed part 33*a.* The temporary retaining recessed part 33*b* is a recessed part that is shallower than the retaining recessed part 33*a,* forming a step 33*c* (see FIG. 8) between the temporary retaining recessed part 33*b* and the retaining recessed part 33*a.* As depicted in FIG. 9B, when the cam part 51 passes between the control protruding part 25*b* and the aft-upward extending part 24, the support shaft part 52 of the actuator 50 mates with the temporary retaining recessed part 33*b* and the actuator 50 is retained by the temporary retaining recessed part 33*b.*

Here, as depicted in FIG. 9B, the stopper protruding part contacted part 53 of the actuator 50 is positioned above the stopper protruding part 35 of the housing 30. The stopper protruding part 35 and the connecting part 54 formed on the actuator 50 face each other in the forward direction. A recessed part 54*a* is formed on the front side of the connecting part 54. The rear end (stopper surface 35*a*) of the stopper protruding part 35 mates with this recessed part 54*a.* By forming this type of recessed part 54*a* on the connecting part 54, interference of the actuator 50 and the stopper protruding part 35 can be avoided during the mount process of the actuator 50 and presence of the connecting part 54 enables ensuring the strength of the stopper protruding part contacted part 53.

Figure 10A:
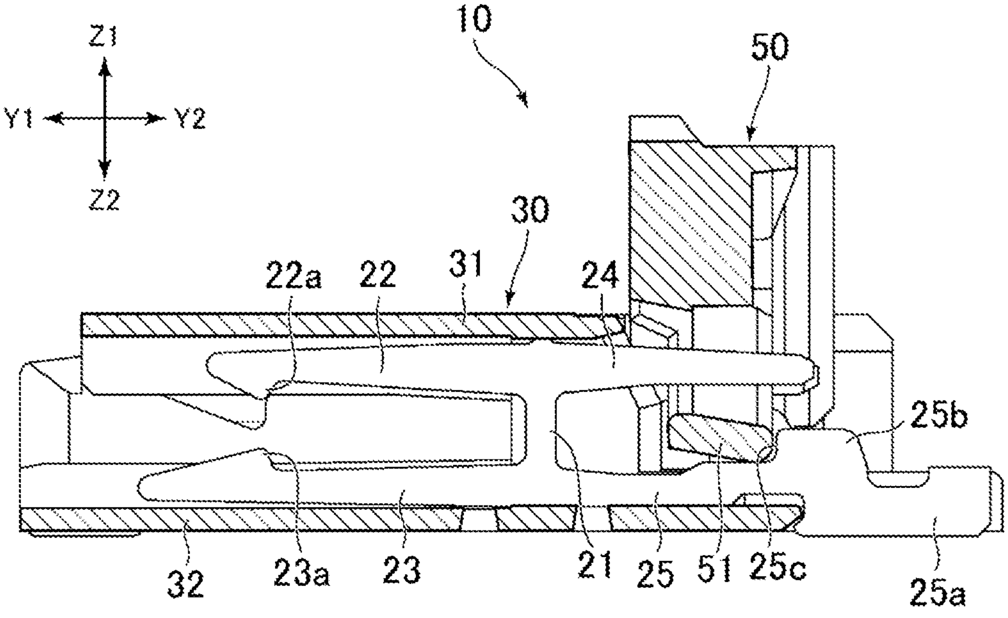
FIG. 10A describes the process of mounting the actuator on the connector. This view is a cross-section view obtained using the same cutting plane as that for FIG. 6A.

Next, as depicted in FIG. 10A, the position of the actuator 50 is lowered. As a result, the support shaft part 52 moves from the temporary retaining recessed part 33*b* to the retaining recessed part 33*a*. The step 33*c* (see FIG. 8) formed between the temporary retaining recessed part 33*b* and the retaining recessed part 33*a* prevents the support shaft part 52 position from returning to the temporary retaining recessed part 33*b* position.

Figure 10B:
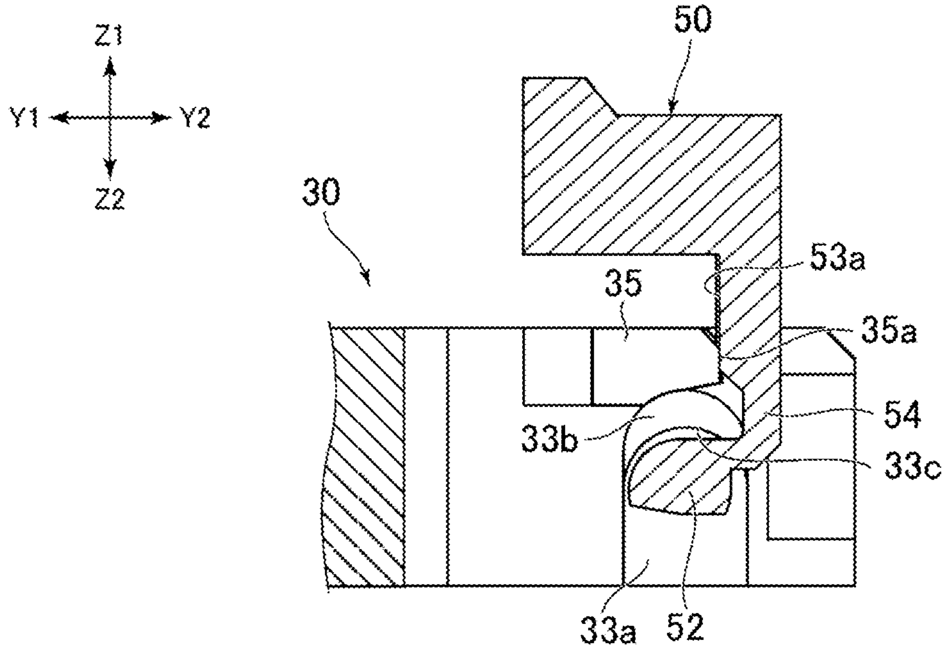
FIG. 10B describes the process of mounting the actuator on the connector. This view is a cross-section view obtained using the same cutting plane as that for FIG. 6B.

As depicted in FIG. 10A and FIG. 10B, lowering the actuator 50 position arranges the actuator 50 in the upright orientation and causes the stopper contacted surface 53*a* and the stopper surface 35*a* to face each other. In addition, as depicted in FIG. 10A, the cam part 51 is thereby positioned to the front of the cam control surface 25*c*.

As has been described above, with the connector 10, when the actuator 50 is in the upright orientation, there is interference between the stopper surface 35*a* and the stopper contacted surface 53*a*, so movement of the actuator 50 around the support shaft part 52 beyond the upright orientation is restricted. The cam control surface 25*c* and stopper surface 35*a* are positioned more to the back than at least a part of the support shaft part 52. With the connector 10, when an unintended external force (F1 in FIG. 6A) is applied to the actuator 50, upward movement of the cam part 51 (movement in direction beyond the cam control surface 25*c*) can be reduced.

Note that the connector proposed in the present disclosure is not limited to the connector 10 described above and may be modified in various ways.

For example, the stopper surface 35*a* may be positioned to the front of the cam control surface 25*c* and to the back of the front end 52*a* of the support shaft part 52. In this case as well, if an unintended external force (F1 in FIG. 6A) is applied to the actuator 50, upward movement of the cam part 51 can be reduced as compared to a conventional structure.

In addition, the stopper protruding part 35 may be a portion extending backward from the upper wall part 31 of the housing 30 rather than from the arm part 33A. In addition, in the case that there is a member mounted on the outside of the housing 30, a part of this member may function as the stopper surface 35*a*.

In addition, a structure for retaining the support shaft part 52 of the actuator 50 is not limited to the example described with reference to FIG. 4 and the like. For example, it is feasible to have the retaining recessed part 33*a* formed on the inner surface of the arm part 33A while the temporary retaining recessed part 33*b* is not formed.

The invention claimed is:

1. A connector, comprising:

a plurality of terminals, each including a contact point and lined up in a first direction;

a housing for retaining the plurality of terminals open facing a first side in a second direction that intersects with the first direction, and into which a flat cable can be inserted through the opening;

an actuator including a cam part for deforming the terminals to press the contact points against the flat cable surface and a stopper contacted surface;

a cam control surface positioned on a second side in the second direction relative to the cam part that controls movement of the cam part toward the second side; and a stopper surface, wherein the actuator is supported by a support shaft part positioned at the end of the actuator in the first direction that enables rotating between an upright orientation and a horizontal orientation, the horizontal orientation is an orientation where the cam part causes deformation to the plurality of terminals to press the contact points against the flat cable, and the upright orientation is an orientation that eliminates deformation of the plurality of terminals caused by the cam part, there is interference between the stopper surface and the stopper contacted surface when the actuator is in the upright orientation and this restricts movement of the actuator around the support shaft part beyond the upright orientation, and the cam control surface and stopper surface are positioned more to the second side in the second direction than at least a part of the support shaft part.

2. The connector according to claim 1, wherein the position of the stopper surface in the second direction is the same as the cam control surface position or more to the second side in the second direction than the cam control surface position.

3. The connector according to claim 1, wherein the housing includes a pair of arm parts extending towards the second side in the second direction, the actuator is provided between the pair of arm parts, and the stopper surface is formed on this pair of arm parts.

4. The connector according to claim 3, wherein a stopper protruding part protruding toward the center of the connector is formed on this pair of arm parts in the first direction, and the stopper protruding part includes a surface facing the second side in the second direction as the stopper surface.

5. The connector according to claim 3, wherein the actuator includes a stopper protruding part contacted part protruding in the first direction, and the stopper protruding part includes a surface facing the first side in the second direction as the stopper contacted surface.

6. The connector according to claim 1, wherein at least one of the stopper surface and stopper contacted surface includes a first edge part positioned to the center in the first direction and a second edge part positioned to the outside in the first direction, and at least one of the stopper surface and the stopper contacted surface is inclined such that the second edge part is positioned more to the first side than the first edge part in the second direction.

* * * * *